(12) United States Patent
Wu et al.

(10) Patent No.: US 11,350,063 B2
(45) Date of Patent: May 31, 2022

(54) CIRCUIT FOR CORRECTING LATERAL CHROMATIC ABBERATION

(71) Applicant: Apple Inc., Cupertino, CA (US)

(72) Inventors: Chihsin Wu, San Jose, CA (US); David R. Pope, Fremont, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 16/848,131

(22) Filed: Apr. 14, 2020

(65) Prior Publication Data
US 2021/0321065 A1 Oct. 14, 2021

(51) Int. Cl.
| H04N 9/04 | (2006.01) |
| G06T 5/00 | (2006.01) |
| H04N 5/367 | (2011.01) |
| H04N 9/64 | (2006.01) |

(52) U.S. Cl.
CPC ......... *H04N 9/04517* (2018.08); *G06T 5/006* (2013.01); *H04N 5/367* (2013.01); *H04N 9/646* (2013.01); *G06T 2207/10024* (2013.01)

(58) Field of Classification Search
CPC .... H04N 9/04517; H04N 5/367; H04N 9/646; H04N 5/3572; H04N 5/232; H04N 5/23229; H04N 7/0135; H04N 9/045; H04N 9/0451; H04N 9/04515; H04N 9/04511; H04N 9/04513; H04N 9/04519; H04N 9/04557; H04N 2209/046; G06T 5/006; G06T 2207/10024; G06T 5/001; G06T 5/002; G06T 5/003; G06T 5/004; G06T 5/005; G06T 5/007; G06T 5/008; G06T 7/90; G03B 2205/00; G03B 5/00
See application file for complete search history.

(56) References Cited

U.S. PATENT DOCUMENTS

| 6,323,934 B1 | 11/2001 | Enomoto |
| 7,751,642 B1 * | 7/2010 | Persson ..................... G06T 5/20 382/266 |
| 8,055,070 B2 | 11/2011 | Bassi et al. |
| 9,105,090 B2 | 8/2015 | Haribhatt et al. |
| 2013/0050544 A1 * | 2/2013 | Kano ................. H04N 9/04519 348/242 |
| 2013/0321675 A1 | 12/2013 | Cote et al. |
| 2015/0271355 A1 * | 9/2015 | Matsumoto ........... H04N 1/215 348/231.2 |
| 2015/0334360 A1 * | 11/2015 | Okudera ............ G02B 27/0025 348/222.1 |
| 2019/0066275 A1 * | 2/2019 | Ito ......................... H04N 5/232 |

FOREIGN PATENT DOCUMENTS

| EP | 2421248 A2 * | 2/2012 | ......... H04N 5/23258 |
| WO | WO-2020260574 A1 * | 12/2020 | ......... H04N 9/04515 |

OTHER PUBLICATIONS

Blueman, D. J., "Chromatic Aberration Recovery on Arbitrary Images," University of Bristol Department of Computer Science, Sep. 2011, pp. 1-92.

\* cited by examiner

*Primary Examiner* — Jose L Couso
(74) *Attorney, Agent, or Firm* — Fenwick & West LLP

(57) ABSTRACT

Embodiments relate to lateral chromatic aberration (LCA) recovery of raw image data generated by image sensors. A chromatic aberration recovery circuit performs chromatic aberration recovery on the raw image data to correct the resulting LCA in the full color images using pre-calculated offset values of a subset of colors of pixels.

20 Claims, 10 Drawing Sheets

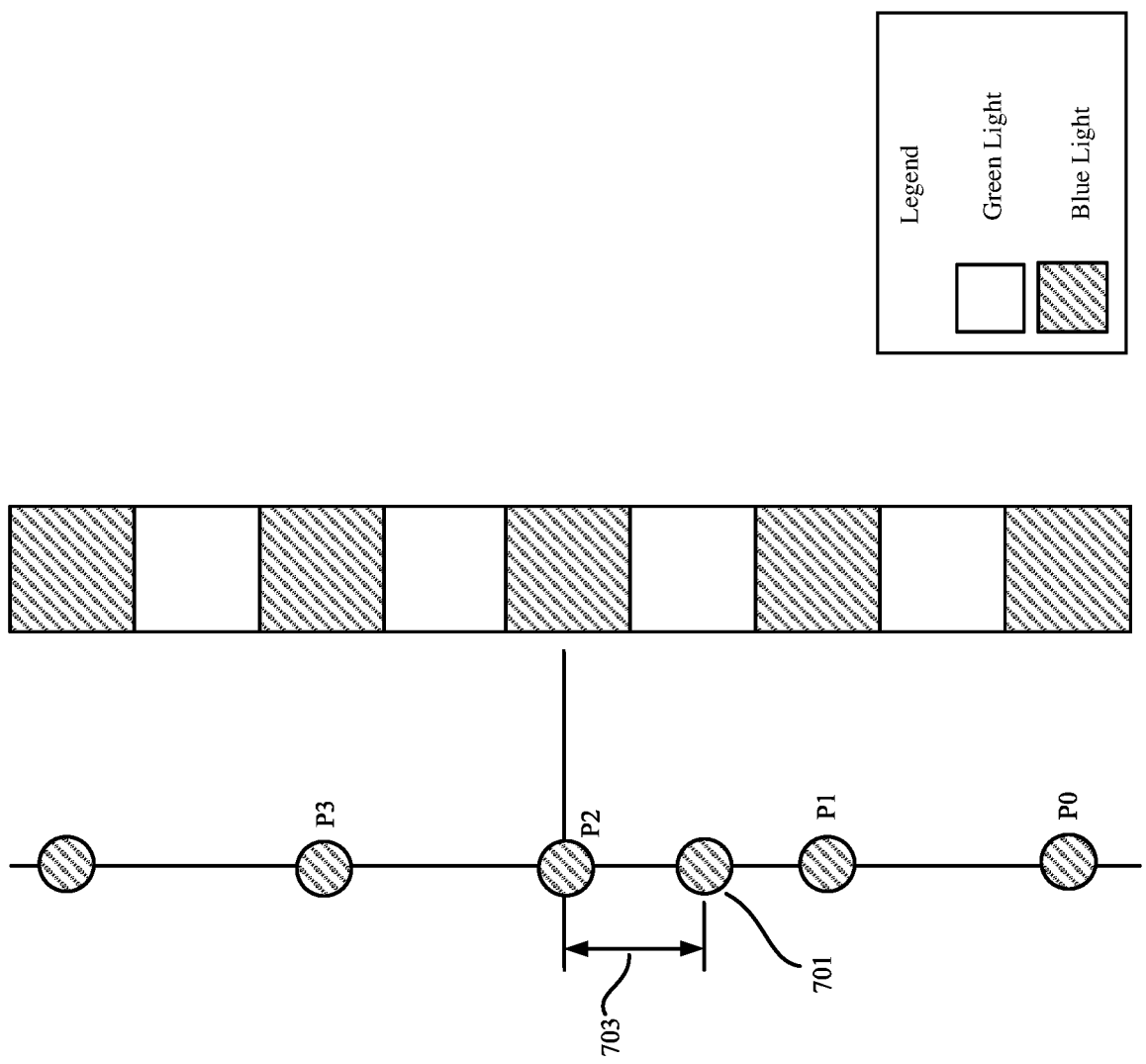

CIRCUIT FOR CORRECTING LATERAL CHROMATIC ABBERATION

BACKGROUND

1. Field of the Disclosure

The present disclosure relates to a circuit for processing images and more specifically to a circuit for performing chromatic aberration recovery on images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to performing one or more image processing algorithms.

However, image processing pipelines do not account for the use of a wide-angle lens (e.g., a fisheye lens) to generate the image data. When a wide-angle lens is used to generate the image data, the refraction angle of light with different wavelength varies thereby manifesting itself on the image sensor as shifted focal points that are not aligned among red, green, and blue color channels. Thus, color fringing is present at sharp and high contrast edges of full-color images generated from the image data.

SUMMARY

Embodiments relate to of the present disclosure relate to a circuit for correcting lateral chromatic aberration (LCA) generated by image sensors. In one embodiment, an image processor circuit receives pixel values of pixels of a color in raw input image data. The color may be red or blue, but not green. The image processor circuit generates a first corrected version of the pixel values. The image processor circuit generates the first correction version of the pixel values by performing interpolation of pixel values of a first subset of pixels of the color arranged in a first direction of the raw image input data. The interpolation may be performed using one or more of first interpolation coefficients that correspond to first offset values representing first distances from the pixels to corresponding virtual pixels in the first direction where the virtual pixels have pixel values that are identical to pixel values of the pixels in the raw image absent lateral chromatic aberrations.

The image processor circuit generates second corrected versions of the pixel values by performing interpolation of the first corrected versions of the pixel values of second subset of pixels of the color arranged in a second direction perpendicular where the second direction is the horizontal direction. The interpolation may be performed using one or more of second interpolation coefficients that correspond to second offset values that represent second distances from the pixels in the raw image input data to the corresponding virtual pixels in the second direction. The second corrected versions of the pixel values are part of a corrected raw image data.

BRIEF DESCRIPTION OF THE DRAWINGS

FIGS. 7A and 7B are conceptual diagrams illustrating vertical interpolation and horizontal interpolation of the raw image data, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to lateral chromatic aberration (LCA) recovery of raw image data generated by image sensors. In one embodiment, raw image data may be in a Bayer color filter array (CFA) pattern (hereinafter also referred to as a "Bayer pattern"). A full-color image created from a Bayer pattern that is generated by an image sensor using a wide-angle lens typically has LCA and axial chromatic aberration (ACA). For a wide-angle lens, the refraction angle for light with different wavelengths varies and manifests itself on image sensors as shifted focal points that are misaligned among red, green, and blue color channels and results in color fringing at sharp and high contrast edges in the full color image. A chromatic aberration recovery circuit performs chromatic aberration recovery on raw image data captured with the wide-angle lens to correct the resulting LCA in the full color images.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
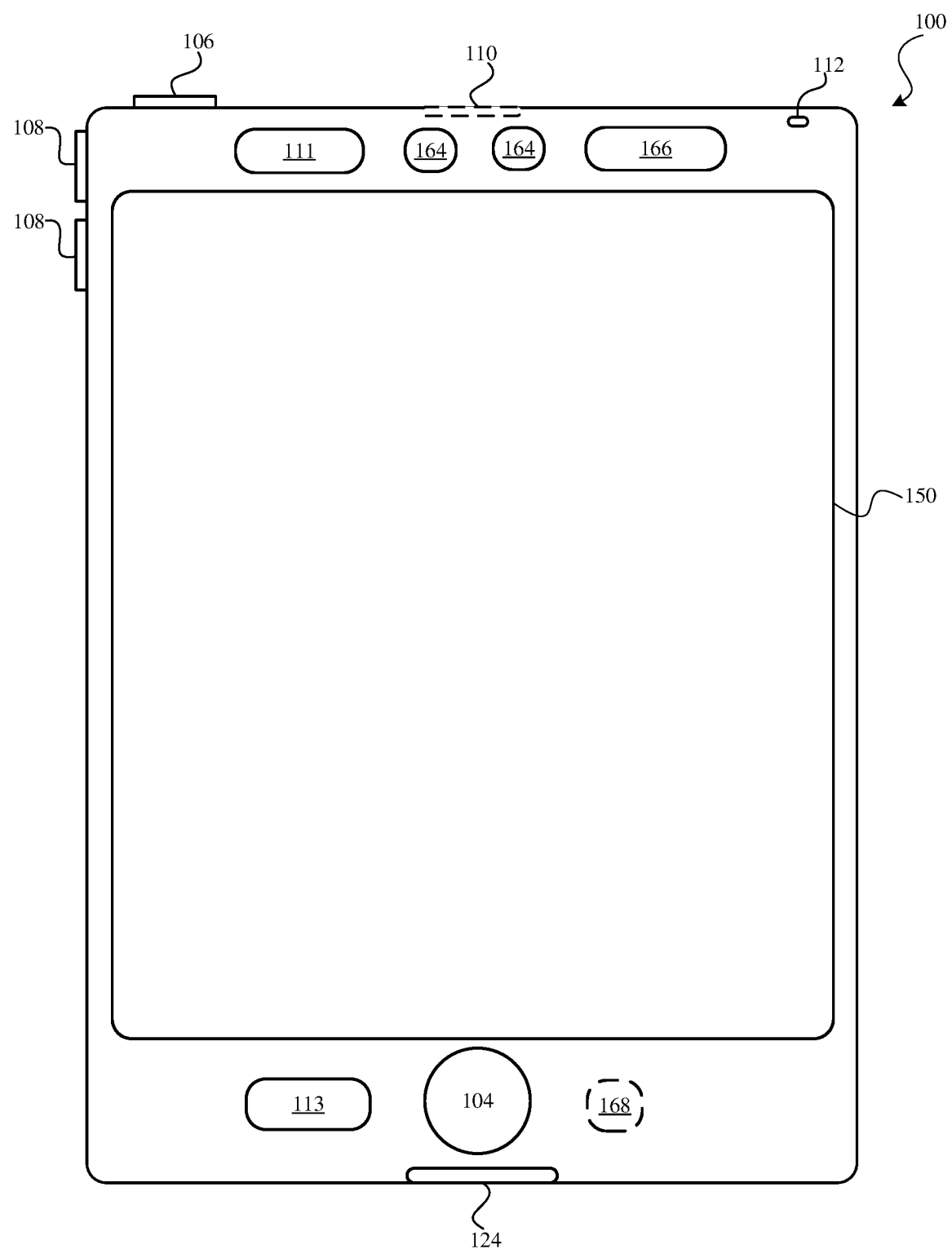
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally or alternatively, the image sensors 164 may be associated with different lens configuration. For example, device 100 may include rear image sensors, one with a wide-angle lens and another with as a telephoto lens.

The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
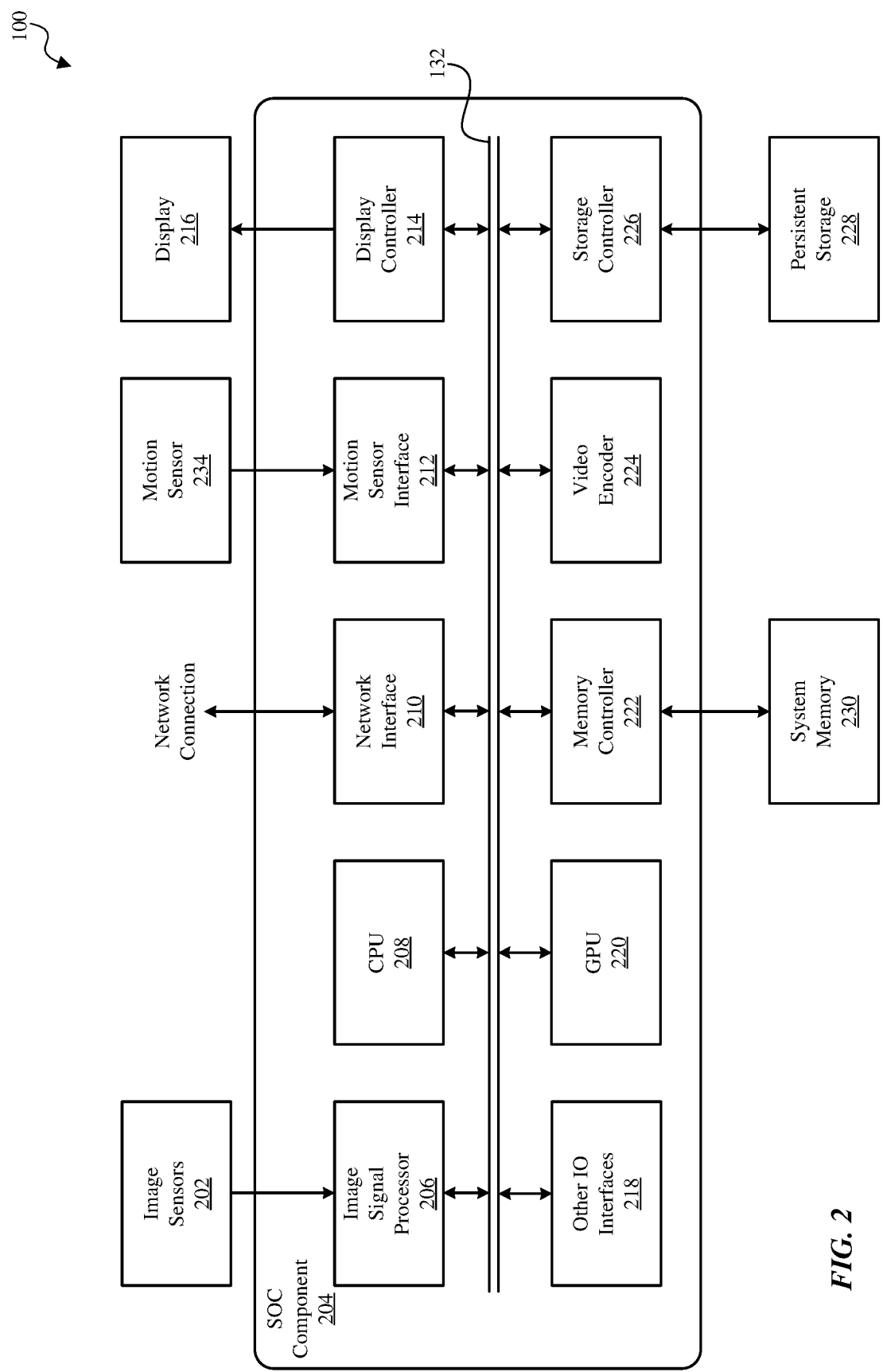
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the focal length of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
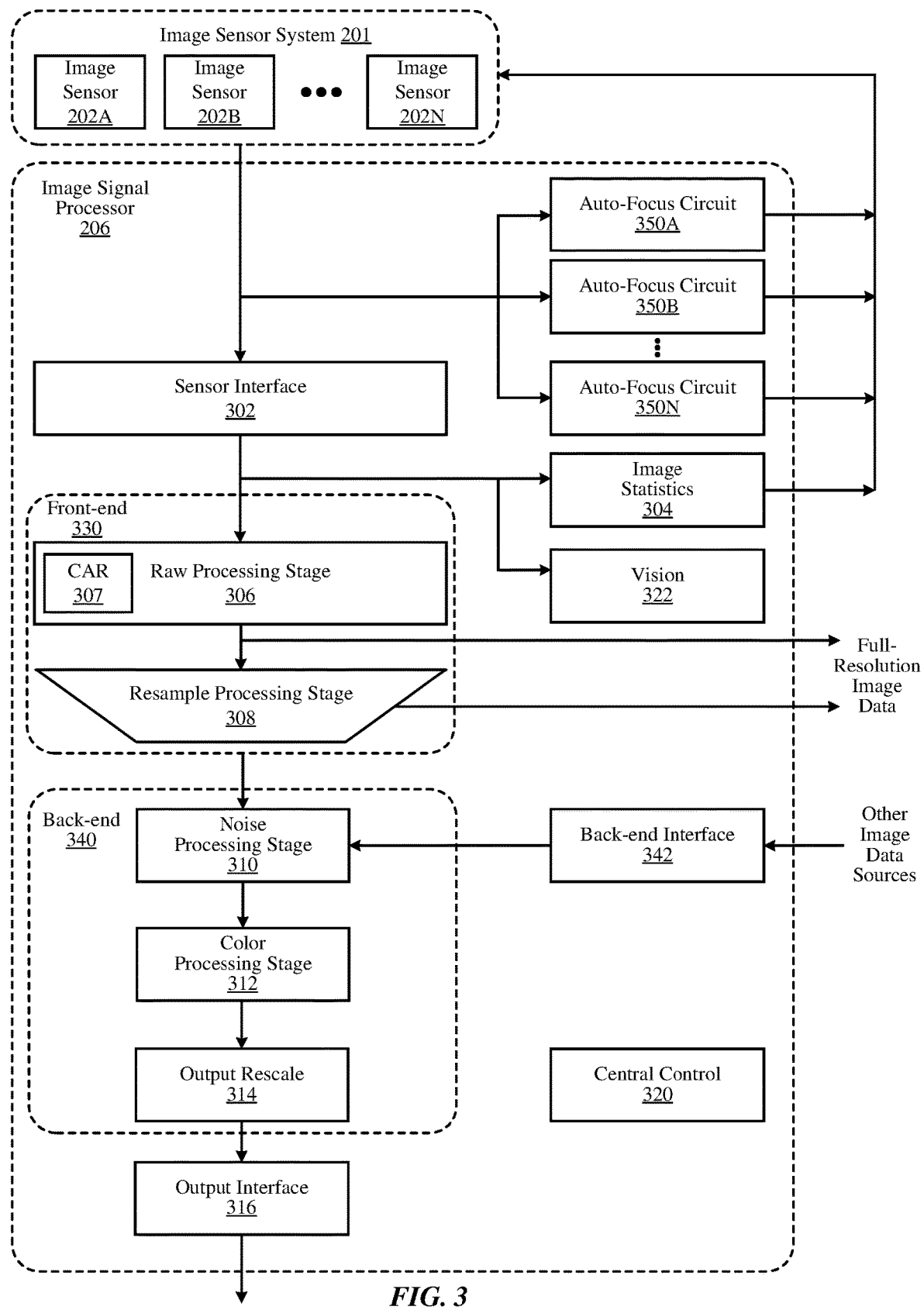
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the focal lengths of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate focal length of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate focal length. The image processing operations may include cropping, binning, image compensation, scaling to generate data that is used for auto-focusing purpose. The auto-focusing data generated by auto-focus circuits 350 may be fed back to the image sensor system 201 to control the focal lengths of the image sensors 202. For example, an image sensor 202 may include a control circuit that analyzes the auto-focusing data to determine a command signal that is sent to an actuator associated with the lens system of the image sensor to change the focal length of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the focal length of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its focal length because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, highlight recovery, and chromatic aberration recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Chromatic aberration recovery is performed by chromatic aberration recovery circuit (CAR) 307 and refers to correcting chromatic aberrations in raw image data images resulting from the use of a wide-angle lens to generate the images. Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, the resample processing stage 308 converts RGG format into YCbCr format for further processing. In another embodiment, the resample processing state 308 concerts RBD format into RGB format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three-dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, the output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Chromatic Aberration Recovery

Figure 4B:
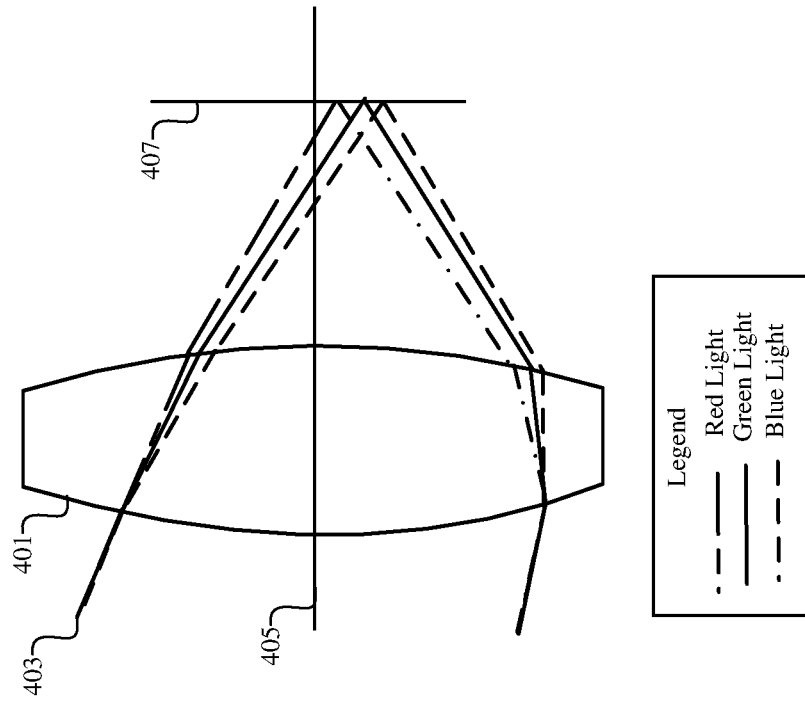
FIGS. 4A and 4B are conceptual diagrams illustrating longitudinal/axial chromatic aberration and lateral/transverse chromatic aberration, according to one embodiment.
Figure 4A:
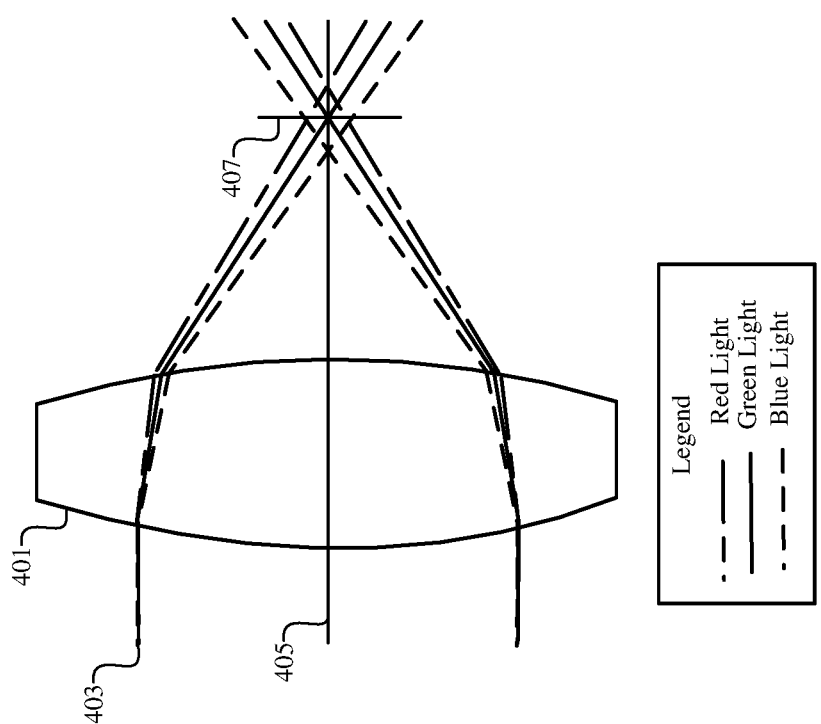

In general, chromatic aberration is caused by the inability of a lens to focus different wavelengths of light (e.g., different colors of light) to the same point. FIG. 4A illustrates an example of longitudinal (e.g., axial) chromatic aberration. As shown in FIG. 4A, wide-angle lens 401 refracts light 403 such that different wavelengths of light (e.g., red light, green light, and blue light) are focused at different distances from the wide-angle lens 401 along the optical axis 405. FIG. 4B illustrates lateral (e.g., transverse) chromatic aberration, according to one embodiment. As shown in FIG. 4B, the wide-angle lens 401 refracts light 403 such that the different wavelengths (e.g., red light, green light, and blue light) are focused at different positions on the focal plane 407. Chromatic aberration due to the usage of the wide-angle lens 401 as described with respect to FIGS. 4A and 4B manifests itself as color fringing at edges in full color images.

Figure 5:
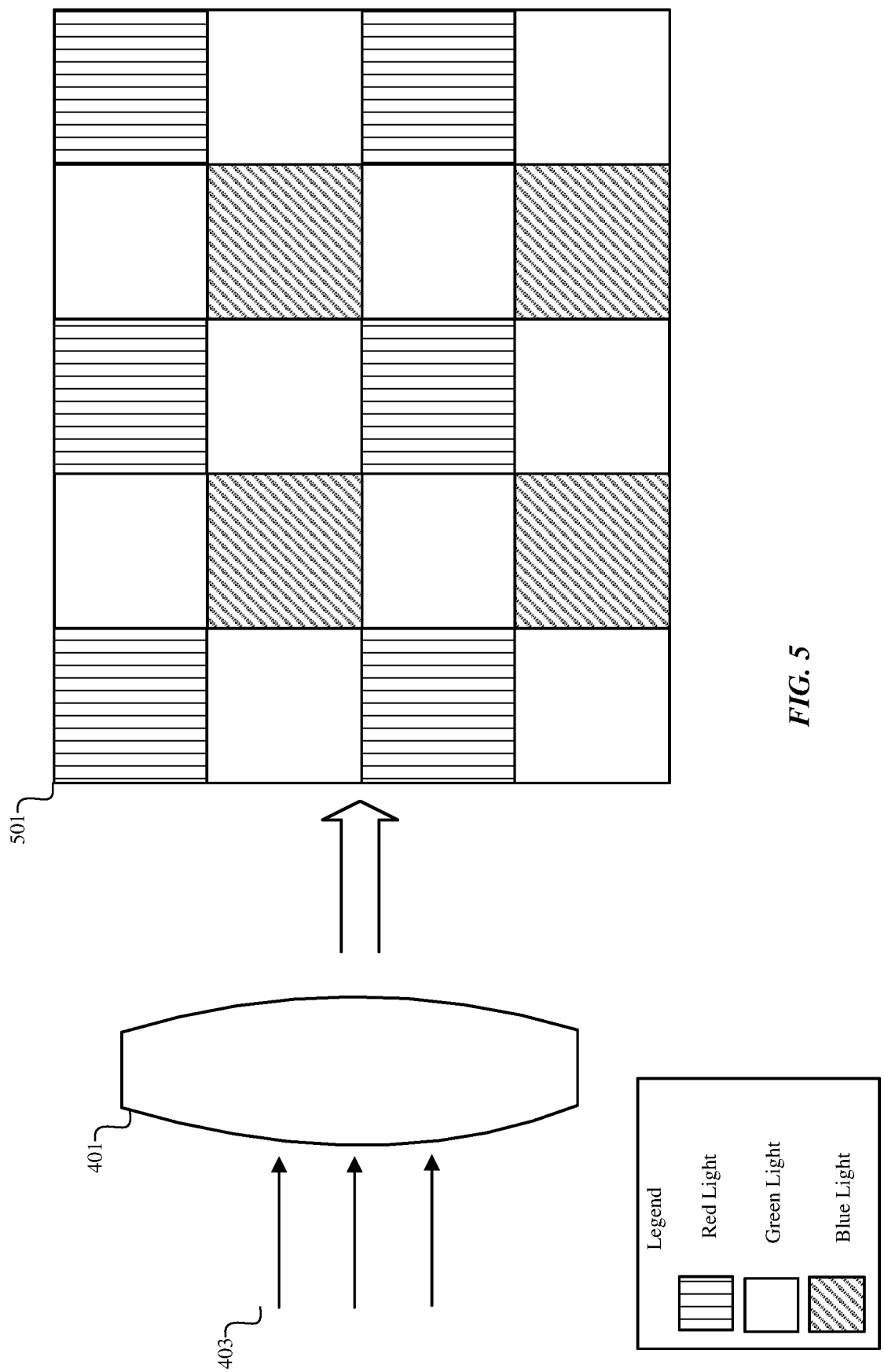
FIG. 5 is a conceptual diagram illustrating raw image data generated by an image sensor using a wide-angle lens, according to one embodiment.

FIG. 5 illustrates raw image data generated using light 403 captured by image sensor 202 using the wide-angle lens 401 in one embodiment. As shown in FIG. 5, the raw image data is in a Bayer pattern 501. The Bayer pattern 501 includes alternating rows of red-green pixels and green-blue pixels. Generally, the Bayer pattern 501 includes more green pixels than red or blue pixels due to the human eye being more sensitive to green light than both red light and blue light.

Figure 6:
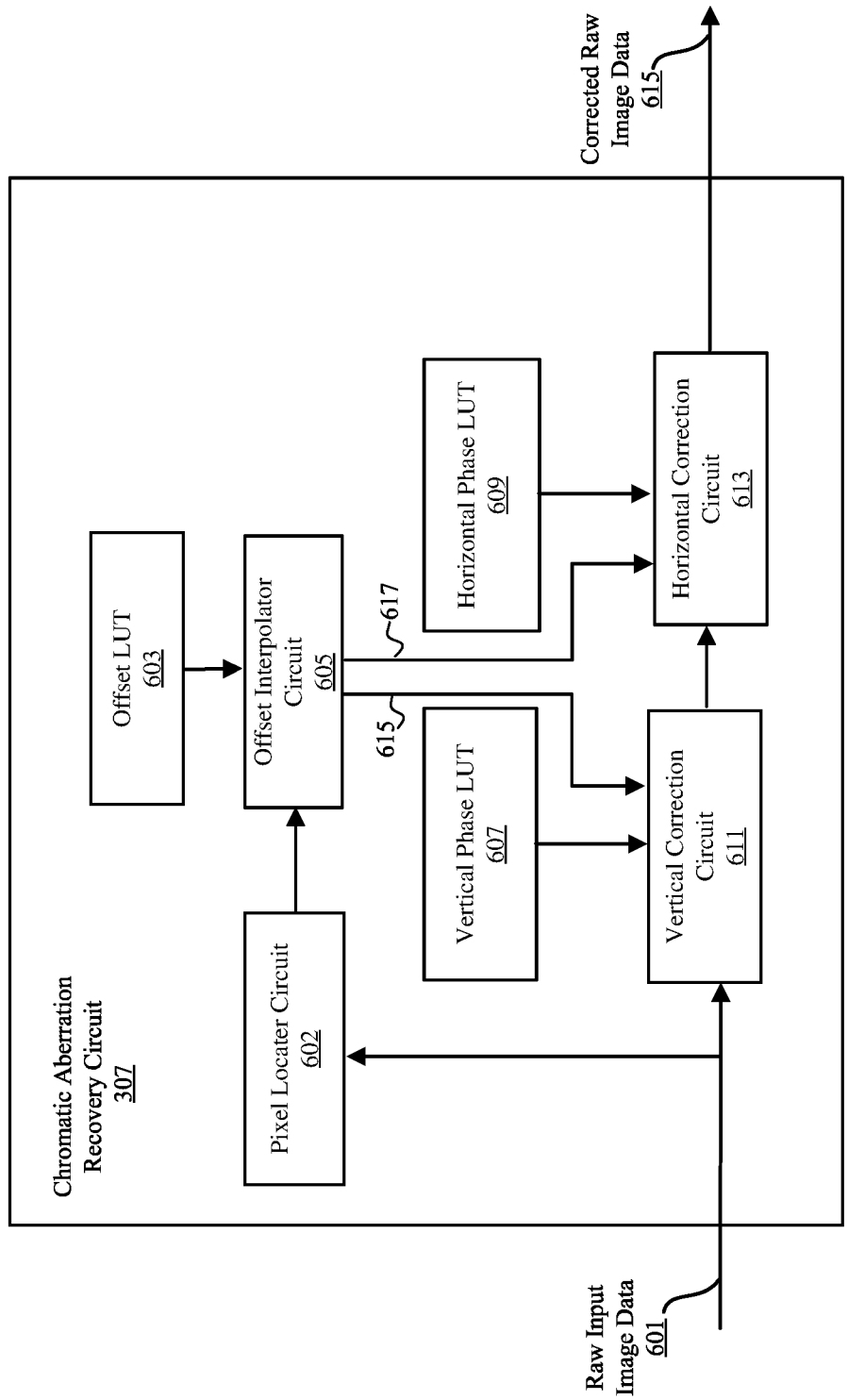
FIG. 6 is a block diagram illustrating a detailed view of a chromatic aberration recovery (CAR) circuit, according to one embodiment.

FIG. 6 is a block diagram illustrating a detailed view of the chromatic aberration recovery (CAR) circuit 307, according to one embodiment. The CAR circuit 307 receives raw input image data 601 and generates corrected raw image data 615 by correcting chromatic aberrations. In one embodiment, the raw input image data 601 is a Bayer pattern that is generated by image sensor 202 using a wide-angle lens as described with respect to FIG. 5. A full-color image generated from the raw input image data 601 includes chromatic aberrations due to using the wide-angle lens to generate the raw input image data 601 By using the corrected raw image data 615 to generate a full-color image rather than the raw input image data 601, chromatic aberrations in the full-color image is reduced. While the description herein describes the CAR circuit 307 receiving raw input image data 601, in other embodiments the CAR circuit 307 may receive RBG image data and generate corrected RBG image data by correcting chromatic aberrations in the RGB image data.

In one embodiment, the CAR circuit 307 includes a pixel locater circuit 602, an offset look-up table (LUT) 603, an offset interpolator circuit 605, a vertical phase LUT 607, a horizontal phase LUT 609, a vertical correction circuit 611, and a horizontal correction circuit 613. In other embodiments, the CAR circuit 307 may have additional or fewer circuits and LUTs than those shown in FIG. 6.

The pixel locater circuit 602 receives the raw input image data 601. The pixel locater circuit 602 identifies the location of each pixel in the raw input image data 601. The identified location of each pixel in the raw input image data 601 is provided to the offset interpolator circuit 605. Based on the Bayer pattern arrangement, the pixel locater circuit 602 determines the locations of red and blue pixels for correcting chromatic aberrations.

In one embodiment, offset LUT 603 stores a grid of pre-calculated horizontal and vertical offset values. A horizontal offset value and a vertical offset value for a certain pixel represent, respectively, a horizontal distance and a vertical distance to a virtual pixel with a pixel value that corresponds to a pixel value of the certain pixel had there not been any chromatic aberrations. The grid includes a plurality of grid points having a plurality of pixel offset values. The pre-calculated offset values in the grid may be associated with optical configurations of a corresponding image sensor 202 (e.g., use of a specific wide-angle lens). Thus, the offset LUT 603 may store different sets of offset values that are each associated with different image sensors 202. In one or more embodiments, the grid is coarser than the arrangement of pixels of the Bayer pattern 501. A particular pixel location may be associated with one or more grid points and comprises four pixel offset values: a horizontal pixel offset value for the red pixels, a vertical pixel offset value for the red pixels, a horizontal offset value for the blue pixels, and a vertical offset value for the blue pixels.

The offset interpolator circuit 605 is coupled to the pixel locater circuit 602 and receives the identified locations of the pixels from the pixel locater circuit 602. In one embodiment, the offset interpolator circuit 605 calculates horizontal and vertical offset values for a subset of pixels (e.g., blue and red pixels) included in the raw input image data 601. Specifically, the offset interpolator circuit 605 calculates the horizontal and vertical offset values of a blue or red pixel by performing interpolation on pre-calculated horizontal and vertical offset values of grid points surrounding the blue or red pixel as described below with reference to FIG. 8. That is, for each red or blue pixel in the raw input image data 601, the offset interpolator circuit 605 calculates a horizontal pixel offset for the red color channel of the pixel, a vertical pixel offset value for the red color channel of the pixel, a horizontal pixel offset for the blue color channel of the pixel, and a vertical pixel offset value for the blue color channel of the pixel. Thus, the offset interpolator circuit 605 does not calculate horizontal and pixel offsets for the green color channel of the pixel. However, in other embodiments, the offset interpolator circuit 605 may also calculate a horizontal pixel offset for the green color channel of the pixel and a vertical pixel offset value for the green color channel of the pixel. Generally, when the horizontal and vertical pixel offset values for two color channels are calculated, the horizontal and vertical pixel offset values for the remaining color channel (RGB) are not calculated.

FIG. 7A illustrates vertical offset pixel correction for a blue color channel of pixel 701 included in the raw input image data 601. Due to chromatic aberrations in the vertical direction, the pixel value of blue pixel P2 captured by the image sensor 202 (and representing in the Bayer pattern 501) is inaccurate. Rather, the pixel value of blue pixel P2 is obtained from a virtual pixel 701 vertically offset by a distance 703 indicated by an arrow shown in FIG. 7A (assuming that there is no horizontal shifting of focal point due to chromatic aberrations). As will be further described below, the vertical pixel offset 703 indicated by the arrow is used as a parameter to interpolate the pixel value at virtual pixel location 701 using pixel values of neighboring blue pixels P0, P1, P2, and P3 in the vertical direction. The pixel value of the virtual pixel location 701 then replaces the pixel value of blue pixel P2 as a corrected pixel value. Such replacement of pixel values is performed for all blue pixels to account for the vertical chromatic aberration. The red color channel of pixels also have their vertical offset corrected in a similar manner as the blue color channel of pixels shown in FIG. 7A.

Figure 7B:
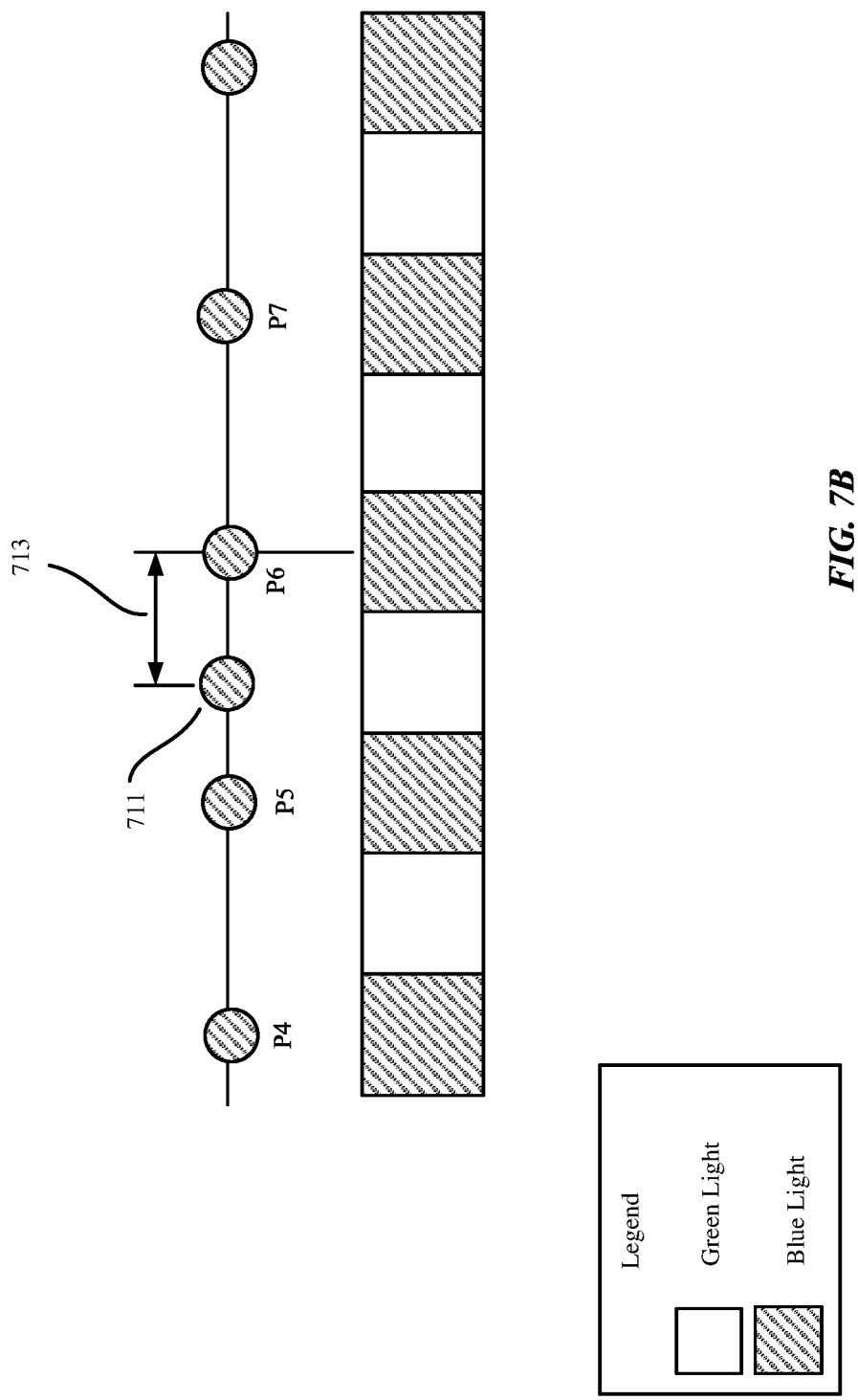

FIG. 7B illustrates horizontal pixel offset correction for the blue color channel of pixel 701 included in the raw input image data 601. The blue pixels in FIG. 7B have pixel values corrected using vertical offsets as explained above with reference to FIG. 7A. As shown in FIG. 7B, the pixel value of blue pixel P6 which has the vertical chromatic aberration does not take into account the horizontal chromatic aberration. In order to account for the horizontal chromatic aberration, the pixel value of pixel P6 is replaced with a pixel value of a virtual pixel 711 that is horizontally offset from pixel P6 by a distance 713. As will be further described below, the horizontal pixel offset 713 is used as a parameter to interpolate pixel values of neighboring pixels P4, P5, P6, and P7 in the horizontal direction. Such replacement is performed across all blue pixels to correct the horizontal chromatic aberration. The red color channel of pixels also have their horizontal offset corrected in a similar manner as the blue color channel of pixels shown in FIG. 7B.

Figure 8:
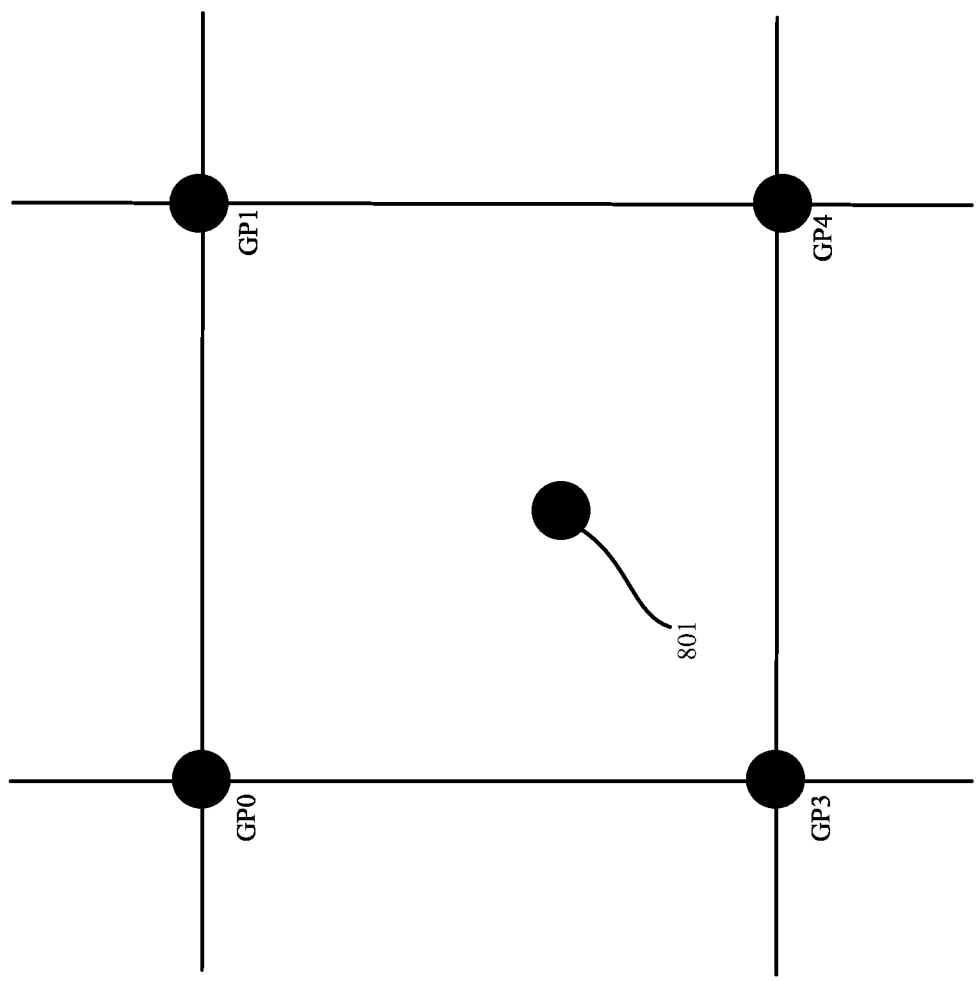
FIG. 8 is a diagram illustrating pixel neighbors of a given pixel, according to one embodiment.

FIG. 8 illustrates grid points GP0 through GP4 that surrounds a given pixel 801, in one embodiment. As described above, each of grid points GP0 through GP4 has an associated vertical and horizontal offset values for red and blue pixels stored in offset LUT 603. If pixel 801 is a red pixel, the offset interpolator circuit 605 performs a bilateral interpolation on four vertical offset values of the four grid points GP0 through GP4 for red pixels and generates an interpolated vertical offset value 615 for the red pixel. The offset interpolator circuit 605 also performs a bilateral interpolation on four horizontal offset values of the four grid points GP0 through GP3 for red pixels and generates an interpolated horizontal offset value 617 for the red pixel. If pixel 801 is a blue pixel, the offset interpolator circuit 605 performs a bilateral interpolation on four vertical offset values of the four grid points GP0 through GP3 for blue pixels and generates an interpolated vertical offset value 615 for blue red pixel, and performs a bilateral interpolation on four horizontal offset values of the four grid points GP0 through GP3 for blue pixels and generates an interpolated horizontal offset value 617 for the blue pixel.

Referring back to FIG. 6, the offset interpolator circuit 605 provides the vertical pixel offset values 615 for the red and blue color channels of each pixel in the raw input image data 601 to the vertical phase LUT 607 and provides the horizontal pixel offset values 617 for the red and blue color channels to the horizontal phase LUT 609. In one embodiment, the vertical phase LUT 607 stores a table of interpolation coefficients (e.g., spline interpolator coefficients) for a plurality of phases in the vertical direction where each phase has a set of coefficients C0, C1, C2, and C3. Similarly, the horizontal phase LUT 609 stores a table of interpolation coefficients (e.g., spline interpolation coefficients) for a plurality of phases in the horizontal direction where each phase has a set of coefficients C0, C1, C2, and C3. Each table of interpolator coefficients is pre-computed and is associated with the same wide-angle lens that is associated with the offset LUT 603.

The vertical phase LUT 607 uses the vertical pixel offsets calculated for the red and blue color channels for each pixel to define the phase of bilinear interpolation in the vertical direction. Similarly, the horizontal phase LUT 609 uses the horizontal offsets calculated for the red and blue color channels for each pixel to define the phase of bilinear interpolation in the horizontal direction. The phase in each of the vertical and horizontal directions functions as an index to its respective set of coefficients in the respective phase LUT.

The vertical phase LUT 607 identifies the set of coefficient values that are associated with the vertical pixel offset values for the red color channel and the set of coefficient values that are associated with the vertical pixel offset values for the blue color channels and provides the identified sets of coefficient values to the vertical correction circuit 611. Similarly, the horizontal phase LUT 509 identifies the set of coefficients that are associated with the horizontal pixel offset value for the red color channel and the set of coefficient values that are associated with the horizontal pixel offset value for the blue color channel and provides the identified sets of coefficients to the horizontal correction circuit 611.

The vertical correction circuit 611 calculates blue and red pixel values with chromatic aberrations corrected in the vertical direction relative to raw input image data 601. No change is made to the green pixel values. In one embodiment, the vertical correction circuit 611 calculates vertically corrected versions of the red pixel values ($P_v$) and the vertically corrected versions of the blue pixel values ($P_v$) using spline interpolation. One example of the spline function is as follows:

$$P_v = \tfrac{1}{2}((u^2(2-u)-u)) \cdot p_{n-1} + (u^2(3u-5)+2)) \cdot p_n + (u^2(4-3u)+u)) \cdot p_{n+1} + (u^2(u-1))) \cdot p_{n+2} \qquad (1)$$

$$P_v = C_0 P_0 + C_1 P_1 + C_2 P_2 + C_3 P_3 \qquad (2)$$

where u represents a vertical pixel offset values, $P_0$ through $P_3$ represent pixel values of four blue or red pixels in the same column and closest to a virtual pixel corresponding to the blue or red pixel whose value is being corrected to account for chromatic aberrations, and $C_0$ through $C_3$ are the interpolation coefficients. Note that the usage of the spline function is just one example for correcting chromatic aberration. In other embodiments, different functions may be used for performing image sharpening or image smoothing, or any combination of thereof with chromatic aberration correction.

To calculate the vertically corrected version of a pixel value for a red pixel, the vertical correction circuit 611 obtains the pixel offset values 615 from offset interpolator circuit 605, retrieves a set of coefficients $C_0$, $C_1$, $C_2$, and C3 corresponding to the pixel offset value 615 from the vertical phase LUT 607. Using the pixel offset values of the pixel's neighbors and the set of coefficients, the vertical correction unit 611 calculates the pixel correction value of the red color channel for each pixel using equation (2).

To calculate the vertically corrected version of a pixel value for a blue color, the vertical correction circuit 611 obtains the pixel offset values 615 from offset interpolator circuit 605, retrieves a set of coefficients $C_0$, $C_1$, $C_2$, and C3 corresponding to the pixel offset value 615 from the vertical phase LUT 607. Using the pixel offset values of the pixel's neighbors and the set of coefficients, the vertical correction unit 611 calculates the pixel correction value of the blue color channel for each pixel using equation (2).

The horizontal correction circuit 613 calculates blue and red pixel values with chromatic aberrations corrected in the horizontal direction relative to raw input image data 601. No change is made to the green pixel values. In one embodiment, the horizontal correction circuit 613 calculates horizontally correction versions of the red pixel values ($P_h$) and vertically correction versions of the blue pixel values ($P_h$) using spline interpolation. One example of the spline function is as follows:

$$P_h = \tfrac{1}{2}((v^2(2-v)-v)) \cdot p_{n-1} + (v^2(3v-5)+2)) \cdot p_n + (v^2(4-3v)+v)) \cdot p_{n+1} + (v^2(v-1))) \cdot p_{n+2} \quad (3)$$

$$P_y = C_4 P_4 + C_5 P_5 + C_6 P_6 + C_7 P_7 \quad (4)$$

where v represents a horizontal pixel offset value, $P_4$ through $P_7$ represent pixel values of four blue or red pixels in the same column and closest to a virtual pixel corresponding to the blue or red pixel whose value is being corrected to account for chromatic aberrations, and $C_4$ through $C_7$ are the interpolation coefficients.

To calculate the horizontally corrected version of a pixel value for a red pixel, the horizontal correction circuit 613 obtains the pixel offset values 617 from offset interpolator circuit 605, retrieves a set of coefficients $C_4$, $C_5$, $C_6$, and C7 corresponding to the pixel offset value 617 from the horizontal phase LUT 609. Using the pixel offset values of the pixel's neighbors and the set of coefficients, the horizontal correction unit 613 calculates the pixel correction value of the red color channel for each pixel using equation 4.

To calculate the horizontally corrected version of a pixel value for a blue pixel, the horizontal correction circuit 613 obtains the pixel offset values 617 from offset interpolator circuit 605, retrieves a set of coefficients $C_4$, $C_5$, $C_6$, and C7 corresponding to the pixel offset value 617 from the horizontal phase LUT 609. Using the pixel offset values of the pixel's neighbors and the set of coefficients, the horizontal correction unit 613 calculates the pixel correction value of the blue color channel for each pixel using equation 4.

The horizontal and vertical pixel correction values for the blue color channel and the horizontal and vertical pixel correction values for the red color channel of each pixel from the raw input image data 601 represent the corrected raw image data 615 shown in FIG. 6. The corrected raw image data 615 can be used by the image signal processor 206 to generate a full-color image with reduced chromatic aberrations.

Figure 9:
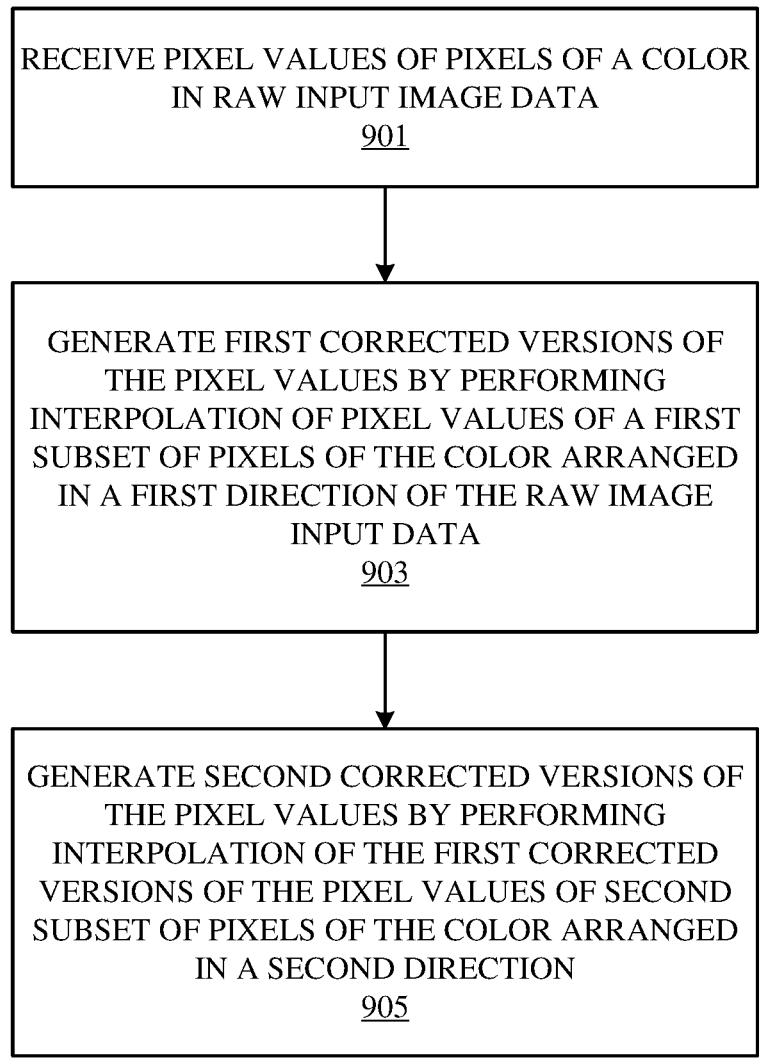
FIG. 9 is a flowchart illustrating a method of performing chromatic aberration recovery to reduce color fringing of raw image data, according to one embodiment.

FIG. 9 is a flowchart illustrating a method of performing chromatic aberration recovery to reduce color fringing of raw image data, according to one embodiment. The steps of the method may be performed in different orders, and the method may include different, additional, or fewer steps.

In one embodiment, CAR circuit 307 receives 901 pixel values of pixels of a color in raw input image data. The color may be red or blue, but not green. The CAR circuit 307 generates 903 first corrected version of the pixel values. In one embodiment, the CAR circuit 307 generates the first correction version of the pixel values by performing interpolation of pixel values of a first subset of pixels of the color arranged in a first direction of the raw image input data where the first direction is the vertical direction. The interpolation may be performed using one or more of first interpolation coefficients that correspond to first offset values representing first distances from the pixels to corresponding virtual pixels in the first direction where the virtual pixels have pixel values that are identical to pixel values of the pixels in the raw image absent lateral chromatic aberrations.

The CAR circuit 307 generates second corrected versions of the pixel values by performing interpolation of the first corrected versions of the pixel values of second subset of pixels of the color arranged in a second direction perpendicular where the second direction is the horizontal direction. The interpolation may be performed using one or more of second interpolation coefficients that correspond to second offset values that represent second distances from the pixels in the raw image input data to the corresponding virtual pixels in the second direction. The second corrected versions of the pixel values are part of a corrected raw image data.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

The invention claimed is:

1. An image processor comprising:
a first correction circuit configured to:
receive pixel values of pixels of a color in a raw input image data, and
generate first corrected versions of the pixel values by performing interpolation of pixel values of a first subset of pixels of the color arranged in a first direction of the raw image input data using one or more of first interpolation coefficients corresponding to first offset values representing first distances from the pixels to corresponding virtual pixels in the first direction, the virtual pixels having pixel values that are identical to pixel values of the pixels in the raw image absent lateral chromatic aberrations; and
a second correction circuit configure to:
receive the first corrected versions of the pixel values, and
generate second corrected versions of the pixel values by performing interpolation of the first corrected versions of the pixel values of second subset of pixels of the color arranged in a second direction perpendicular to the first direction using one or more of second interpolation coefficients corresponding to second offset values representing second distances from the pixels in the raw image input data to the corresponding virtual pixels in the second direction, the second correction circuit including the second corrected versions of the pixel values as part of a corrected raw image data.

2. The image processor of claim 1, further comprising:
an offset interpolator circuit configured to determine the first offset values and the second offset values of the pixels in the raw image input data by bilateral interpolating predetermined first offset values and predetermined second offset values associated with grid points neighboring the pixels in the raw input image data.

3. The image processor claim 2, further comprising:
an offset look-up table configured to store the predetermined first offset values and the predetermined second offset values associated with the grid points;
a first phase look-up table configured to store the first interpolation coefficients indexed by the first distances or first parameters derived from the first distances; and
a second phase look-up table configured to store the second interpolation coefficients indexed by the second distances or second parameters derived from the second distances.

4. The image processor of claim 1, wherein the raw input image data and the corrected raw image data is in a Bayer pattern.

5. The image processor of claim 1, wherein the first direction is a vertical direction and the second direction is a horizontal direction.

6. The image processor of claim 5, wherein a first corrected version of a pixel value for a pixel in the raw input image data is generated by interpolating pixel values for a number of pixels in the same column as the pixel, and a second corrected version of the pixel value for the pixel is generated by interpolating first corrected versions of pixel values for the same number of pixels in the same row as the pixel.

7. The image processor of claim 1, wherein receiving pixel values of pixels of the color in the raw input image data includes receiving pixel values of pixels in colors of red, green, and blue, and wherein the pixel values of pixels of two of the colors are updated by the first correction circuit and the second correction circuit, and pixel values of pixels of a remaining one of the colors is not updated by the first correction circuit and the second correction circuit.

8. The image processor of claim 1, wherein the color is blue or red, and wherein pixel values of green pixels are not updated by the first correction circuit and the second correction circuit.

9. The image processor of claim 1, wherein the interpolation performed by the first correction circuit uses a first function defined by the one or more of the first interpolation coefficients, and the second correction circuit uses a second function defined by the one or more of the second interpolation coefficients.

10. A method comprising:
receiving pixel values of pixels of a color in a raw input image data;
generating first corrected versions of the pixel values by performing interpolation of pixel values of a first subset of pixels of the color arranged in a first direction of the raw image input data using one or more of first interpolation coefficients corresponding to first offset values representing first distances from the pixels to corresponding virtual pixels in the first direction, the virtual pixels having pixel values that are identical to pixel values of the pixels in the raw image absent lateral chromatic aberrations; and
generating second corrected versions of the pixel values by performing interpolation of the first corrected versions of the pixel values of second subset of pixels of the color arranged in a second direction perpendicular to the first direction using one or more of second interpolation coefficients corresponding to second offset values representing second distances from the pixels in the raw image input data to the corresponding virtual pixels in the second direction, the second correction circuit including the second corrected versions of the pixel values as part of a corrected raw image data.

11. The method of claim 10, further comprising:
determining the first offset values and the second offset values of the pixels in the raw image input data by bilateral interpolating predetermined first offset values and predetermined second offset values associated with grid points neighboring the pixels in the raw input image data.

12. The method claim 11, further comprising:
storing, in an offset look-up table, the predetermined first offset values and the predetermined second offset values associated with the grid points;
storing, in a first phase look-up table, the first interpolation coefficients indexed by the first distances or first parameters derived from the first distances; and
storing, in a second phase look-up table, the second interpolation coefficients indexed by the second distances or second parameters derived from the second distances.

13. The method of claim 10, wherein the raw input image data and the corrected raw image data is in a Bayer pattern.

14. The method of claim 10, wherein the first direction is a vertical direction and the second direction is a horizontal direction.

15. The method of claim 14, wherein a first corrected version of a pixel value for a pixel in the raw input image data is generated by interpolating pixel values for a number of pixels in the same column as the pixel, and a second corrected version of the pixel value for the pixel is generated by interpolating first corrected versions of pixel values for the same number of pixels in the same row as the pixel.

16. The method of claim 10, wherein receiving pixel values of pixels of the color in the raw input image data includes receiving pixel values of pixels in colors of red, green, and blue, and wherein the pixel values of pixels of two of the colors are updated and pixel values of pixels of a remaining one of the colors is not updated.

17. The method of claim 10, wherein the color is blue or red, and wherein pixel values of green pixels are not updated by the first correction circuit and the second correction circuit.

18. The method of claim 10, wherein the interpolation of the pixel values of the first subset of pixels uses a first spline function defined by the one or more of the first interpolation coefficients, and interpolation of the first corrected versions of the pixel values uses a second spline function defined by the one or more of the second interpolation coefficients.

19. A system comprising:
an image sensor comprising configured to capture an image data;
an image processor comprising:
a first correction circuit configured to:
receive pixel values of pixels of a color in a raw input image data, and
generate first corrected versions of the pixel values by performing interpolation of pixel values of a first subset of pixels of the color arranged in a first direction of the raw image input data using one or more of first interpolation coefficients corresponding to first offset values representing first distances from the pixels to corresponding virtual pixels in the first direction, the virtual pixels having pixel values that are identical to pixel values of the pixels in the raw image absent lateral chromatic aberrations; and
a second correction circuit configure to:
receive the first corrected versions of the pixel values, and
generate second corrected versions of the pixel values by performing interpolation of the first corrected versions of the pixel values of second subset of pixels of the color arranged in a second direction perpendicular to the first direction using one or more of second interpolation coefficients corresponding to second offset values representing second distances from the pixels in the raw image input data to the corresponding virtual pixels in the second direction, the second correction circuit including the second corrected versions of the pixel values as part of a corrected raw image data.

20. The system of claim 19, wherein the image processor further comprises:

an offset interpolator circuit configured to determine the first offset values and the second offset values of the pixels in the raw image input data by bilateral interpolating predetermined first offset values and predetermined second offset values associated with grid points neighboring the pixels in the raw input image data.

\* \* \* \* \*